United States Patent [19]

Garthwaite

[11] Patent Number: 4,795,348

[45] Date of Patent: Jan. 3, 1989

[54] COMMUNICATION AID METHOD AND APPARATUS FOR THE HANDICAPPED

[76] Inventor: Patricia J. Garthwaite, 2964 Tincup Cir., Boulder, Colo. 80303

[21] Appl. No.: 115,740

[22] Filed: Nov. 2, 1987

[51] Int. Cl.⁴ ............................................. G09B 21/00
[52] U.S. Cl. ................................... 434/112; 434/168; 434/430
[58] Field of Search .............. 434/112, 156, 157, 167, 434/168, 172, 190, 430

[56] References Cited

U.S. PATENT DOCUMENTS

| | | | |
|---|---|---|---|
| 208,780 | 10/1878 | Winder | 116/325 |
| 400,345 | 3/1889 | Kennedy | 116/325 |
| 415,105 | 11/1889 | Grafton | 116/325 X |
| 1,168,949 | 1/1916 | McKittrick et al. | 434/168 |
| 1,400,887 | 12/1921 | Liebman | 434/200 |
| 1,406,592 | 2/1922 | Watkins | 434/407 |
| 1,520,648 | 12/1924 | Holt | 40/107 |
| 1,573,358 | 2/1926 | Ross | 434/407 |
| 1,735,883 | 11/1929 | Smith | 434/190 |
| 2,722,754 | 11/1955 | Slote | 434/190 |
| 3,010,228 | 11/1961 | Torre | 434/168 |
| 3,197,891 | 8/1965 | Pierce | 434/167 X |
| 3,224,128 | 12/1965 | Steward | 434/108 X |
| 3,496,653 | 2/1970 | Wolfner et al. | 434/168 |
| 3,716,935 | 2/1973 | Friederichs | 434/430 X |
| 3,726,026 | 4/1973 | Borcherding | 40/600 X |
| 3,823,491 | 7/1974 | Lehmann | 434/168 |

Primary Examiner—William H. Grieb
Attorney, Agent, or Firm—Earl C. Hancock; F. A. Sirr

[57] ABSTRACT

A communication aid that is useful to individuals who have lost the ability to communicate with other individuals by talking and/or writing. The communication aid includes a generally flat plate or panel which carries thereon a plurality of short message portions, such as words or phrases in human readable form. A plurality of manually placeable tokens are provided. Each token carries a sequence indicator, such as a number or letter, thereon. The handicapped individual selectively places a number of these tokens on the plate in a sequence, so as to communicate a message logically readable by individuals who observe the plate. This complete message is composed by reading the short message portions in the sequential order of the numbers or letters that are carried by the tokens, to thereby form the long message.

11 Claims, 1 Drawing Sheet

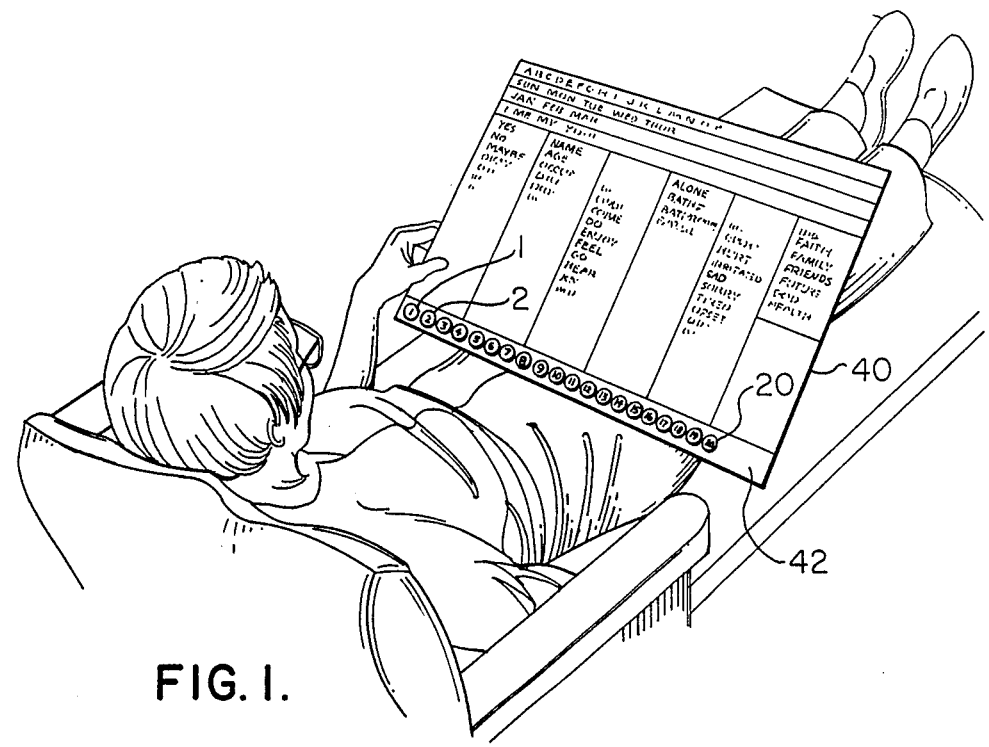

COMMUNICATION AID METHOD AND APPARATUS FOR THE HANDICAPPED

DESCRIPTION

FIELD OF THE INVENTION

This invention relates to the field of communication aids. More particularly, the present invention relates to methods and apparatus for allowing a person to communicate at least key elements of multiple word sentences to another without the need for writing or speaking by the communicator. The present invention has particular utility for the handicapped in that it makes it possible for them to communicate by the use of movable indicators which establish sentence or message formations readable by an observer.

BACKGROUND OF THE INVENTION

The use of indicator boards or plates as information retention aids and educational aids is well known. U.S. Pat. Nos. 208,780; 400,345; 415,105; 1,400,887; 1,406,592; 1,520,648 and 1,573,358 are examples thereof.

Boards of this general type are known where manually placeable indicators or tokens are held to the board by magnetic attraction. U.S. Pat. Nos. 1,168,949; 1,735,883; 2,722,754; 3,010,228; 3,224,128; 3,496,653 and 3,726,026 are examples.

U.S. Pat. No. 3,823,491 discloses a teaching aid of this latter type wherein a notebook cover is constructed of a laminate comprising a magnetic sheet or foil and an overlay with pronunciation aiding caricatures thereon. A similarly constructed lap board is also shown in FIG. 6. Ring-like markers (FIG. 7) are placed on the cover overlay so that phonic representations are observable through the marker holes to assist the student in correlating written and spoken words.

While devices of this prior art type are satisfactory for their intended purpose, they do not lend themselves to use by individuals having speech and/or writing handicaps as a means of communicating complex thought messages to other individuals.

More specifically, the prior art does not teach a method or an apparatus suitable for use by an individual with at least a serious speech handicap to communicate with others. This inadequacy is overcome by the present invention which makes it possible for an individual to use a plurality of numbered tokens to select a plurality of short message segments which, when read in the indicated sequence, communicate a complex message made up of said plurality of short message segments.

SUMMARY OF THE INVENTION

The present invention comprises a communication aid for handicapped individuals, whereby a person who can think and mentally formulate complex communication messages, but who is unable to speak and/or write such messages, can still communicate the messages to others by placement of tokens or indicators on a panel member in a manner demanding minimal physical ability or manual dexterity.

The tokens are selectively placed on the panel so as to point to small, incomplete message segments that are contained on the panel. The tokens are constructed and arranged to also indicate the assembly order or sequence intended by the user for the panel's small message segments, to thereby formulate a long message for an observer. The fully assembled message, which is made up of a number of small message portions, thereby communicates the entire long message as the handicapped person mentally formulated it.

An exemplary use of the present invention is by stroke victims, many of whom are not at all impaired in the ability to use the mind, but whose motive functions have been damaged such that speaking or writing is difficult or impossible. These handicapped individuals have often expressed the feeling that they are a prisoner in their own body, due to their ability to reason, coupled with their inability to communicate their reasoned thoughts to others by use of speech or writing.

The present invention provides a method and an apparatus which allows a handicapped individual to use a plurality of numbered tokens so as to select a plurality of short message segments which, when read in the sequence that is indicated by indicia carried on the tokens, communicates a long, complex message made up of said plurality of short message segments.

BRIEF DESCRIPTION OF THE DRAWINGS

FIG. 1 is an isometric view of a panel in accordance with this invention, showing a typical use thereof by an individual.

FIG. 2 is a plan view of a panel of FIG. 1, illustrating exemplary wording for such a panel and showing six of the FIG. 1 tokens arranged to communicate the message "I feel alone sad no friends."

DETAILED DESCRIPTION OF THE PREFERRED EMBODIMENT

The following description of the preferred embodiment of the present invention is made with reference to communication between individuals by means of printed numbers, printed characteristic symbols, and printed words typical of the English language. However, it is to be recognized that the scope of the present invention allows use of any visually interpretable symbols which are informative to the observer including photographs or printings in any language.

The method of the present invention comprises the steps of providing a display panel having a plurality of message items, i.e. numbers, symbols and/or words, printed thereon. The user selectively places sequentially identified tokens on the display panel. Each individual token calls attention (1) to a short message item, and (2) indicates the sequential order in which the message items are intended in order to communicate the longer message to the observer. The apparatus of the present invention advantageously utilizes a generally flat display panel 40. This panel is preferably of a size convenient for use on the lap of the user as shown in FIG. 1, or of a size for mounting on a stand for placement within convenient reach of the user. Panel 40 contains, or is imprinted with, a plurality of message segments, shown in FIG. 2 as individual letters, numbers and words of the English language. For clarity, FIG. 2 shows only samples of word, letter and number groups.

A number of tokens 1 to 20, each having thereon a respective number in the sequence of 1 through 20, are shown in FIG. 1 aligned along the bottom edge 42 of panel 40. This is the storage position for the tokens. These tokens are intended for manual manipulation by the user, in increasing numbered order. The tokens are preferably about the same diameter as a word spacing to minimize confusion as to which word is selected.

FIG. 2 depicts a typical array of words, letters, numbers and abbreviations. In horizontal rows such as 44, 45, 46 and 47 are letters of the alphabet, numbers, calendar abbreviations and pronouns. Panel 40 is here shown divided into a series of vertical columns 51-56 containing lists of somewhat related words. Preferably columns 51-56 are separated by boundary lines to further minimize confusion as to which words are selected and from which column.

FIG. 2 further shows the results of a user selecting the first six tokens that carry the numbers 1 through 6 thereon, and placing these tokens such that the token carrying the number 1 identifies the word "I", the token carrying the number 2 identifies the word "feel", the token carrying the number 3 identifies the word "alone", the token carrying the number 4 identifies the word "sad", the token carrying the number 5 identifies the word "no", and the token carrying the number 6 identifies the word "friends".

In this way, selective use of tokens 1-20 allows the user to string short message segments into sequential arrangements so as to communicate a long complex message to an observer. While the sentence or sentences thus formed are abbreviated, the thoughts the user intended to communicate to another in the above example are unmistakable.

Within the scope of this invention, panel 40 may take many forms. For example, it may be a light weight printed magnetically permeable panel, and tokens 1-20 may take the form of plastic or wood disks having numbers on one side as shown and including small permanent magnets on the opposite side. This is especially advantageous for stroke victims with limited manual dexterity as they can position such disks on the panel with the least difficulty. The tokens could also include a word encircling ring if desired. As another embodiment example, panel 40 may be a rigid wooden board that contains peg holes adjacent each short message segment, in which case tokens 1-20 would comprise numbered pegs arranged for selective insertion into the board peg holes. Yet another example is a printed plastic sheet supported by a rigid substrate board for panel 40. Here, tokens 1-20 are numbered plastic disks or strips that adhere to the printed plastic sheet by plastic-to-plastic adhesion.

Preferably, in all embodiments the imprinted panel 40 includes a blank area available for supplementation of the display with words, names, photographs and the like to permit adaptation of the panel to the needs of the user. An example is shown in FIG. 2 as area 58 in the right corner.

Where replaceable printed overlay sheets are used, a number of different such sheets may provide a variety of selectable subject matter word groupings. For example, a sheet may include political message segments, another might have medical related message segments and another social words In this case, the user of the invention selects the overlay sheet best suited to the messages to the anticipated communications. Further flexibility is possible by forming the overlay from multiple sheet segments each with a set of different words or symbols with one sheet segment providing a user selectable index of the available sheet overlay segments. For instance, rows 44, 45, 46 or 47 might contain an index of subject matters available in the form of removable strip overlay segments for columns 51-56.

As used herein, the term message segment is not limited to single word or multi-word segments. It is possible to communicate many messages by the use of other visually informative indicia, such as numbers, animal outlines, photographs, and the like which the observer can readily interpret. All such message segments and combinations thereof are within the scope of the present invention.

The manually placeable tokens or indicators of the present invention are broadly considered to include any token that adheres to the above mentioned panel upon physical contact or engagement therewith. Such tokens can make use of the well known phenomenon of plastic-to-plastic adherence, or use the well known loop and hook fabrics, of which the brand Velcro is an example.

The preferred embodiment of the present invention makes use of tokens 1-20 that adheres to panel 40 by magnetic attraction. For example, panel 40 is formed of magnetically permeable material, and tokens 1-20 are small permanent magnets, or include small permanent magnets as portions thereof as inserts or attachments to the tokens. A feature of this invention is that tokens 1-20 carry indications of reading sequence thereon, for example numbers or letters.

In use, the handicapped person places tokens 1-20 on panel 40 in a critical sentence order. This order determines the order in which the observer is to read the small message segments, as the complete message is assembled from such small message segments.

While the present invention has been described with particularity with reference to the preferred embodiment thereof, those of normal skill in the art will understand that the general teachings of this invention are extendable to other embodiments, without departing from the spirit and scope of this invention.

What is claimed is:

1. A communication aid for use by handicapped individuals who are unable to effectively speak or write, comprising:
   display means having a plurality of visually interpretable symbols thereon, groupings of multiple ones of said symbols being selectively capable of association in a manner to communicate thoughts that are composed by the mind of the handicapped individual,
   a plurality of manually placeable tokens each having respective indicia of a sequence thereon, and
   means for removably retaining said tokens on said display means for placement on said display means to select multiple symbols in a sequence indicated by the indicia of sequence carried by said tokens with observation of said symbols in the sequence established by said placed tokens providing a visual message corresponding to the thought composed by the handicapped individual,
   thereby communicating the thought composed by the handicapped individual to the observer.

2. The communication aid of claim 1 wherein said display means comprises a magnetically permeable substrate member having an overlay member that carries said symbols thereon, and wherein said tokens are at least partially composed of permanent magnets.

3. The communication aid of claim 2 wherein said overlay member is replaceable by other overlay members having at least some different symbols thereon.

4. The communication aid of claim 1 wherein said display means includes blank areas adapted to be filled in with user selected symbols.

5. A communication aid for use by individuals who have difficulty in effectively communicating by speech or writing comprising:

display panel means having thereon a plurality of visually informative symbols suitable for composition into the essential elements of a complete message, a plurality of token means each manually placeable on said panel means in proximity to selected ones of said symbols by the using individual, each said token means carrying a respective indicia of a sequence, and means temporarily retaining said token means in positions in proximity to said user selected symbols for communicating complete messages to another by observation of said symbols in the sequence of the indicia of said temporarily retained token means.

6. A communication aid in accordance with claim 5 wherein said temporarily retaining means includes means for magnetically adhering said token means to said panel.

7. A communication aid in accordance with claim 6 wherein said token means each have a magnet thereon and said panel is composed of magnetically attracted material.

8. A communication aid, comprising display means having a plurality of generally single-meaning language symbols thereon, groupings of multiple ones of said language symbols being selectively capable of association in a manner to communicate a multi-meaning message to an observer, and a plurality of manually placeable tokes each having respective indicia of sequence thereon, said tokens being adapted for placement on said display means to select multiple ones of said language symbols in a sequence that is indicated by the indicia of sequence carried by said tokens.

9. The communication aid of claim 8 including means for removably retaining said tokens on said display means.

10. A method whereby handicapped individuals who are unable to effectively speak or write compose visual sentence-like messages for visual communication to an observer, comprising the steps of providing a display means having a plurality of visually informative symbols thereon wherein groupings of multiple ones of said symbols are capable of forming said sentence-like message, providing a plurality of manually placeable tokens each having respective indicia of sequence thereon, and selectively placing a multiplicity of said tokens on said display means to select a multiplicity of symbols in the sequence that is indicated by the indicia of sequence on said tokens.

11. The communication aid of claim 10 which includes the step of fabricating said display means and said tokens for mutual magnetic attraction therebetween.

* * * * *